Figure 1:
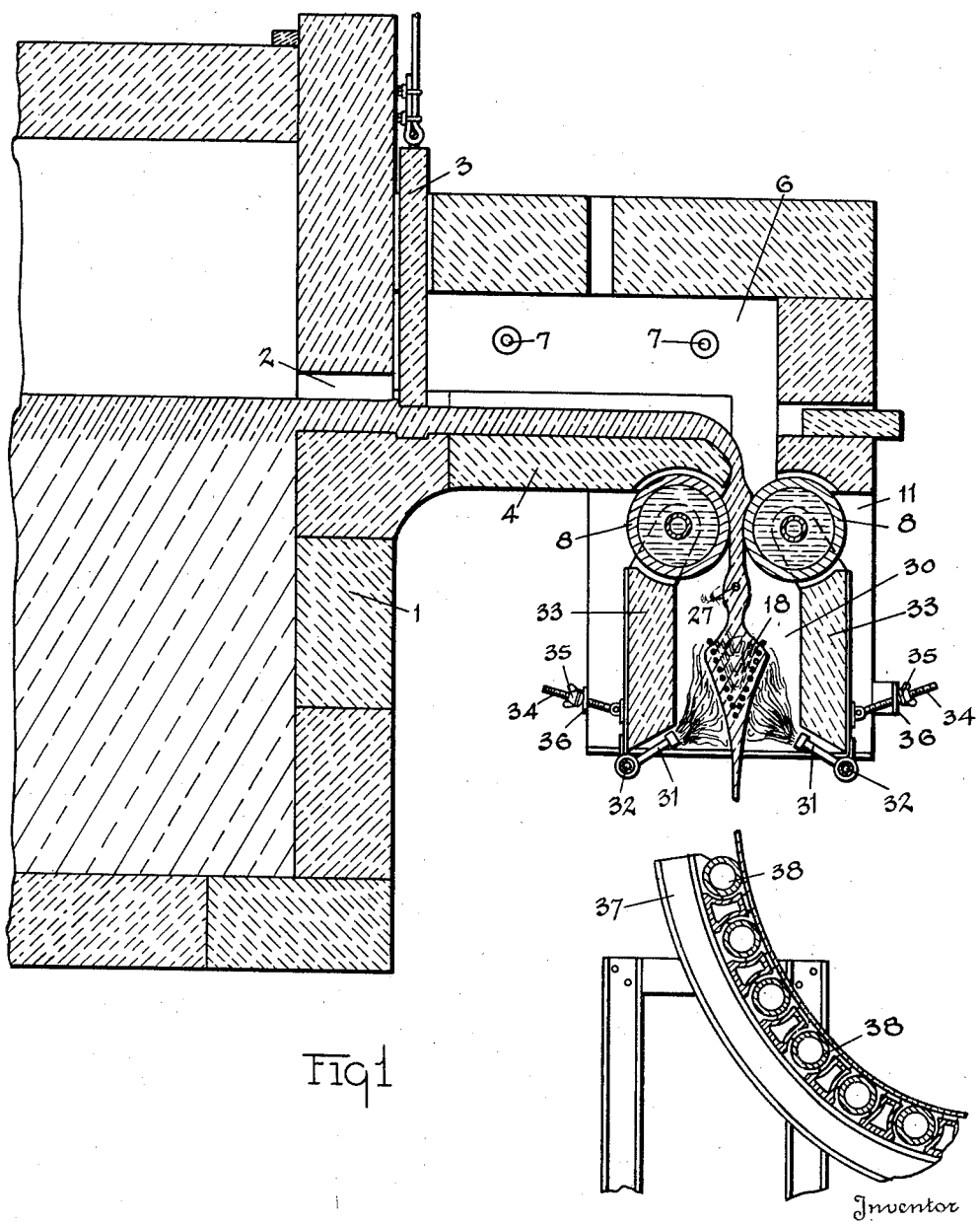

Dec. 17, 1940.  E. DANNER  2,225,369
METHOD AND MEANS FOR FORMING GLASSWARE
Filed Aug. 11, 1936  4 Sheets-Sheet 2

Inventor
Edward Danner
By (signature)
Attorney

Dec. 17, 1940.     E. DANNER     2,225,369
METHOD AND MEANS FOR FORMING GLASSWARE
Filed Aug. 11, 1936     4 Sheets-Sheet 3

Inventor
Edward Danner
By [signature]
Attorney

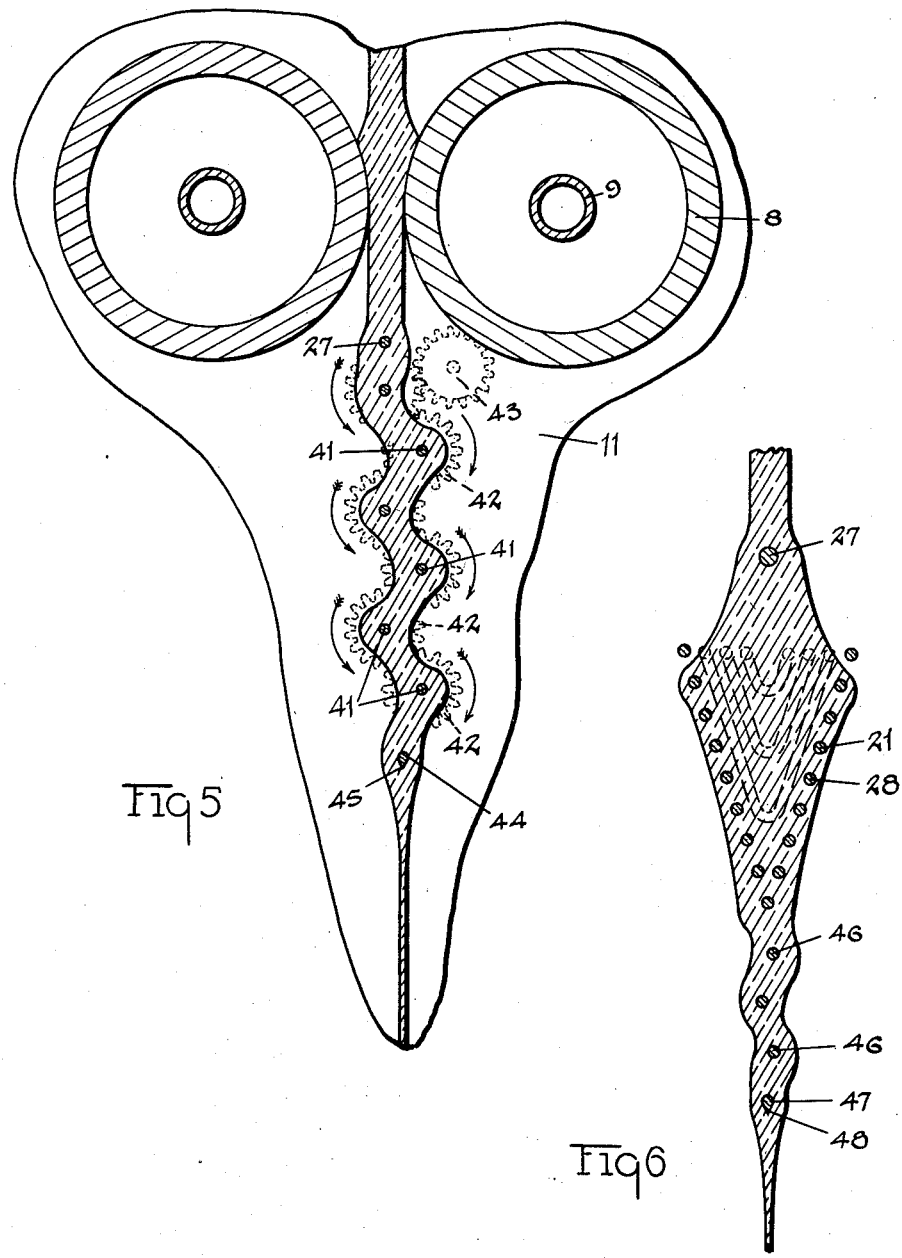

Patented Dec. 17, 1940

2,225,369

UNITED STATES PATENT OFFICE 2,225,369

METHOD AND MEANS FOR FORMING GLASSWARE

Edward Danner, Newark, Ohio

Application August 11, 1936, Serial No. 95,400

18 Claims. (Cl. 49—17)

The invention has for its object to provide a method and means for efficiently manipulating molten glass to enable the production of glassware of exceedingly high quality therefrom, such as glass in the form of sheets, bars, and tubes.

As is well known in the art of forming glassware of the type described, molten glass flowing over refractory clay bodies, such as furnace blocks, pots, troughs, spouts, spreading slabs, and mandrels, produces erosion and chemically reacts with the ingredients of the refractory clay that modifies the composition of localized portions of the glass and also modifies the physical characteristics of such portions. Materials that act as fluxes are quite readily removed from the clay bodies by the erosion of the molten glass. The more solid refractory particles of the clay are carried away in the molten glass and frequently appear as small specks in the finished glassware. Thus, the fluidity of different portions of the molten glass is varied, which produces variation in drawing results and unless sufficient time elapses for the heat to melt the solid particles, they appear in the glass, as finally formed. Also, where glass covers the opposite surfaces of glass spreading slabs or encloses shaping mandrels, air from within the slabs or mandrels or gas chemically formed is entrapped by the glass and is expanded by the heat and is forced to the surfaces of the slabs or mandrels and appear as streaks in the glassware.

Also, in connection with the formation of the glassware of the type described, particularly in the formation of glass sheets, it has been found difficult to produce uniform distribution and uniform rate of flow throughout the width of the spout or trough from which the glass is delivered. Various forms of constructions have been suggested heretofore with reference to producing a uniform rate of delivery of portions of the glass from the spout. Regulative sectional gates have been used without producing perfect rate flow. Also the glass has been discharged on to spaced rotating chilled metal rollers, which has produced more uniform discharge of the glass. Where rollers are used, indentations are produced in the surface of the glass, which require special grinding and polishing of the surface. Also irregular and excess chilling is produced which produces variable viscosity of the surface glass, while the inner glass retains much of its original fluidity and thus the delivering or drawing conditions vary and the thickness of the glass varies. In many instances metal glass-spreading devices are heated to reduce chilling of the surface glass which, however, causes the glass to cling to the hot metal surface and develop coatings of variable thickness on the metal and often produces localized gob-like formation or strings on the delivery edge or surface of portions of the heated metal.

Where glass flows over bodies that are of such a size as to cause the lapse of periods of time of material length before the glass is discharged from the bodies, localized portions of the glass devitrify in advance of the delivery of the glass. The devitrification of the glass produces drawing imperfections, and the granulation produces rough glass. Where the glass is to be directed to spreading or shaping slabs or mandrels to distribute or spread the glass, the temperatures should be relatively high to produce desired fluidity and enable the desired distribution, and, while moving over the slab or mandrel, the glass should be gradually cooled to produce the required drawing viscosity at the point of delivery. Owing to the difficulty of producing uniform progressive temperature variation in the cooling of the glass when located on a slab, the temperature of the glass often drops near or below the critical temperature and is retained at that temperature sufficiently long to initiate devitrification. When the glass is directed over a slab, it progressively thickens until the lower end of the slab is covered with thick glass. The glass contiguous to the slab remains at a low temperature for a considerable time before it is removed in the drawing operation. Devitrification is initiated and spreads up the slab and outwardly to the surface glass on the slab.

Thus, if the slab is too long, the glass devitrifies at the lower edge of the slab. The glass on the slab may be heated, which increases its fluidity and reduces retardation and avoids the period of time required to produce devitrification, but it also reduces viscosity below that required to produce the desired drawing condition of the glass. The slab may be shortened with the result that the temperature of the glass delivered from the slab will likewise be above the proper ware forming temperature. Thus, a glass spreading slab distributes heat and prevents a desired controlled progressive temperature change throughout the glass over the length of the slab.

By my invention glass is caused to flow onto or against and about bodies of exceeding small surface areas, located in spaced relation to cause the glass surface and interior portions to be constantly mixed which produces uniformity of temperature and constituency of the glass. To produce, from flowing glass, highly polished and transparent glassware, the glass should be uniform in its constituency, free from all gases, free flow and distribution of the surface glass should be afforded for a period well in advance of drawing, and the drawing temperature should be within certain limits. The invention provides a method for treating, modifying, or conditioning the glass to produce these advantageous characteristics in the glass.

To efficiently produce these results, I use spaced slender refractory bodies, preferably wires that are supported and secured at their ends by any suitable supporting means to suspend the wires in the glass stream in spaced relation to each other and to other objects or parts of the apparatus in the region of the glass flow to locate the wires within the stream and cause the stream to flow over opposite side parts of each of the wires with reference to the direction of the stream flow to cause retardation and mixing of portions of the glass of the stream, such as the exterior portions with the interior portion of the stream. The wires may be formed in any shape and supported by any suitable means at their ends to suspend the wires crosswise the stream of glass. The wires, intermediate their points of support, may be shaped as may be desired, depending on the results that are desired to be accomplished in the treatment of the molten glass from which ware is to be formed. Different sized wires may be used, but the size should be such as to give sufficient strength to sustain small sub-divided portions of the flowing glass. The wires may be about one-quarter inch in diameter and formed of nichrome. Depending on the amount of the glass and strength of wires, they are spaced from one-quarter of an inch to six or eight inches apart. If the glass is delivered from the lowermost of the wires, the size of the wire should be such as to not only sustain the weight of a portion of the glass, but also sustain any drawing strains. The wires may be spaced as desired and so as to receive glass portions sequentially as the glass flows transverse to the wires. If desired, one or more of the wires may be electrically heated. The wires are preferably connected to a source of electricity through suitable rheostats to regulatively heat the glass. The glass may be exteriorly and regulatively heated. Heating the glass increases the fluidity of the glass. Also the glass may be caused to flow against and over any desired number of wires. Hence, the cooling period may be varied.

The wires may be arranged in any desired form. They may be located in spaced parallel relation in substantially a vertical plane, or they may be located in a plane that slopes with reference to the vertical, providing the inclination of the slope is such to prevent the glass from discharging in gob form from intermediately disposed wires. The wires may be vertically spaced, that is, at different horizontal levels, whether in the same vertical line or not. They also may be horizontally spaced whether in the same horizontal line or not. Also, the wires may be arranged in staggered relation with reference to the vertical to cause a substantially zig-zag flow of the glass from the upper of the wires to the lower of the wires. Also, if desired, one or more of the wires may be rotated by rotating elements to which their ends are connected in order to aid in the mixing of the glass. Also, the wires may be so disposed as to form a cage whereby portions of the glass will flow about and intermediate the wires and be sustained in body form or in the form of a large gob or mass of glass from which the glass may be drawn. If desired, wires may be located within the space of the cage and so as to extend transversely through the body portion of the glass within the cage.

In any arrangement of wires that may be used, the glass may be drawn from the lower most of the wires in forming the glassware, or it may be directed to a special shaping or forming member, either in the form of a wire or a bar as may be desired. Preferably the glass is delivered or drawn to produce a convergent flow of the surface portions of the glass to cause the surface glass of the molten mass to become the surface glass of the ware that flows or is drawn from the wires.

By the use of wires, the difficulties of drawing glass from heated or non-heated slabs are avoided. The surface area of the wires is less than that of the slab, and the glass moves faster over the wires than over a slab. It also mixes as it progresses. The spaced smaller surfaces permit the progressive change of the glass temperature to the proper drawing temperature in a shorter period of time which prevents devitrification. If desired, the wires may be covered with thin wall porcelain sleeves having an outer diameter but slightly greater than that of the wire to heat the glass and protect the wires against the erosion and chemical reaction of glass having highly active fluxes or elements that will chemically react on the metal of the wires.

Also, if desired, cooling rollers may be located intermediate the source of supply and the wires to produce or aid glass distribution. If rollers are used, the glass flows from the rollers to the wires where the glass may be mixed and the temperature raised. The temperature of the glass may then be progressively lowered and the delivery retarded sufficient to restore the surface to a condition such that when the glass is drawn, a highly polished glass will be formed.

The method may be conducted in apparatuses of different forms. To illustrate a practical application of the invention, I have selected an apparatus and modified parts thereof wherein the method may be conducted. The apparatus selected is shown in the accompanying drawings, and the method of forming sheet glass by the use of the apparatus is described hereinafter, it being understood that variations may be made in the apparatus to produce sheet glass and glassware of other forms.

Figure 2:
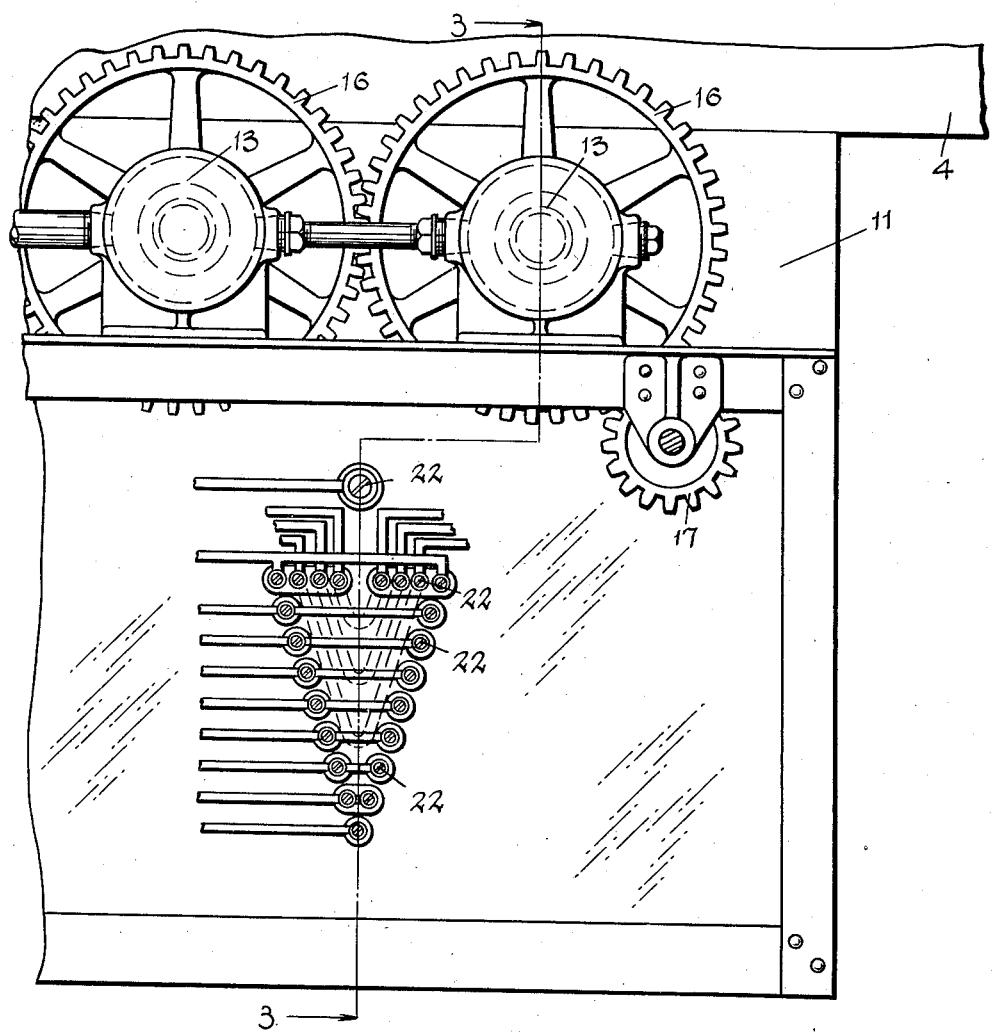
Figure 3:
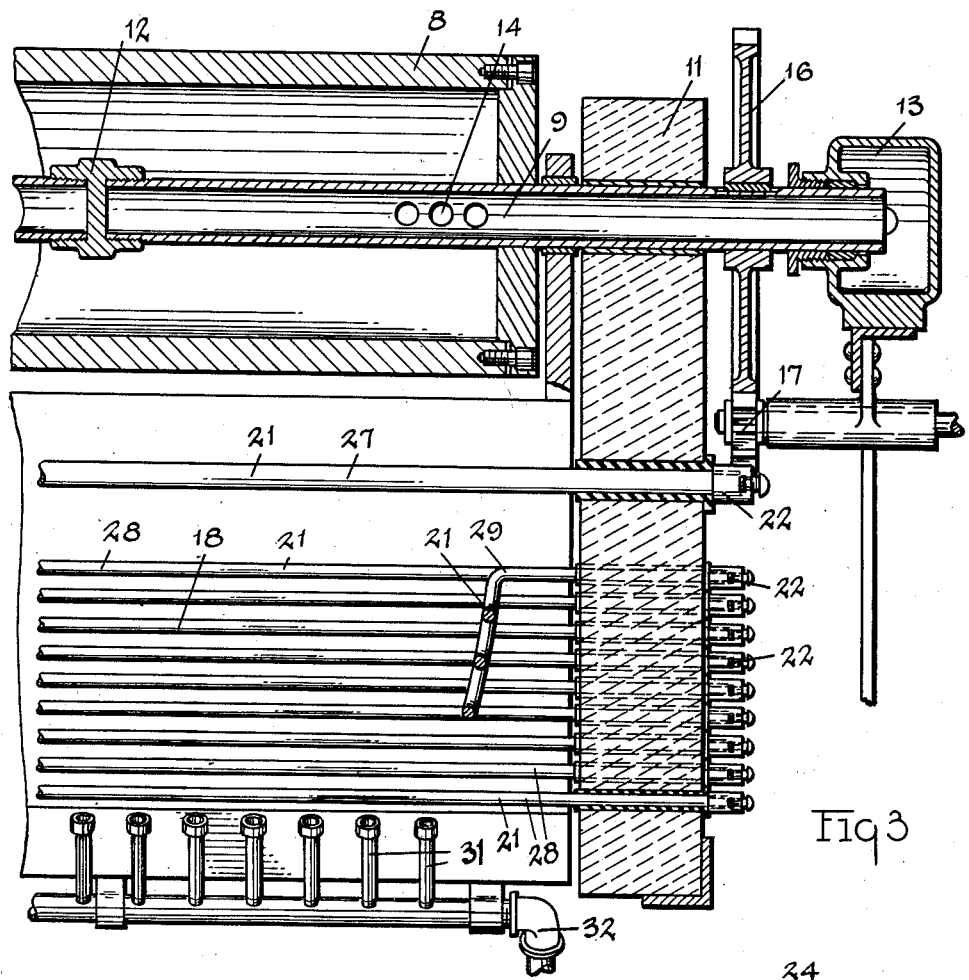
Figure 4:
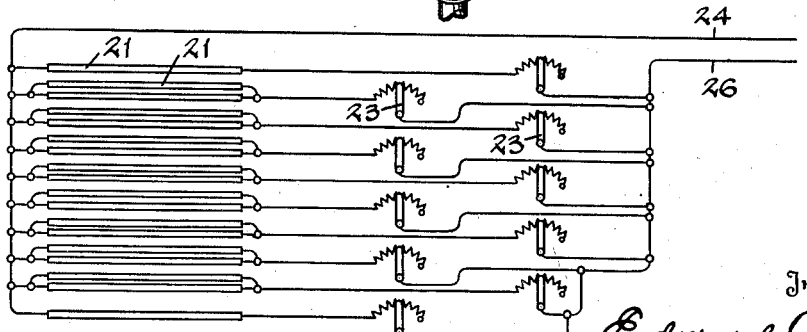

Fig. 1 illustrates a section of a melting furnace and a glassware shaping apparatus. Fig. 2 illustrates a side view of the apparatus. Fig. 3 illustrates a view of a section taken on the plane of the line 3—3 indicated in Fig. 2. Fig. 4 illustrates diametrically the electric connections of a plurality of heating elements with a source of current. Fig. 5 illustrates a modification of the apparatus shown in Fig. 1. Fig. 6 illustrates a modified arrangement of the heating elements shown in Fig. 1.

The glass may be supplied to the apparatus for producing glassware from any suitable source. In the construction shown in Fig. 1, the glass flows from a melting tank 1 to a suitable forehearth having an opening 2, controlled by the gate 3, from which the glass flows to a trough 4. The trough is surrounded by a suitable housing 6 that may be interiorly heated by burners 7. In the form of the apparatus shown in the figure, glass is directed from the trough 4 and the housing 6 to a point between a pair of adjustably spaced, water-cooled rollers 8.

The rollers 8 are connected to hollow shafts 9 that are rotatably supported in depending side walls 11 suitably supported by beams forming the usual frame work of glass furnaces and appended to them. Each shaft 9 is formed of two parts and is centrally closed by the connector 12. The interior of the end parts of the shaft 9 communicates with the boxes 13 that are connected in the circuit of a source of water supply, and openings 14 are formed in parts of the shafts 9 located within and near the ends of the hollow rollers 8. The water thus freely flows through the boxes, the shafts, and the rollers to cool the rollers.

The rollers 8 are driven by gear wheels 16 connected to the shafts 9. The gear wheels mesh and cause opposite rotation of the rollers and the same downward movement of opposed parts of the rollers. The rollers thus produce uniform controlled distribution and discharge of the glass fed to the rollers from overhanging trough 4. The gear wheels 16 may be driven by suitable pinions 17 connected to a source of power.

The glass from the rollers flows on to a plurality of nichrome wires to produce intermixing of the hotter interior glass with the colder exterior glass delivered from the cold surface of the rollers. Preferably the wires are connected to a source of supply of electric current to interiorly heat the glass as it is intermixed by the flow of the glass over the wires.

The wires may be arranged according to the results that are desired to be produced. In the form shown in Fig. 1, the wires are closely spaced and arranged to form a cage 18 to collect and sustain a body of glass and regulate its temperature as it is retarded by the wires to produce uniform constituency and temperature as the sheet glass is delivered from the wires. Thus the wires are disposed substantially horizontally, and the glass is caused to flow over wires disposed parallel to the lateral surfaces of the sheet glass as distinct from the end edge surfaces of the glass.

The wires 21 are insulatingly supported in the walls 11 and are connected by means of binding posts 22 in the circuit of source of supply of electric current. The amount of current flowing through the wires 21 may be varied. The wires 21 may be, if desired, electrically interconnected to cause any combination of series and parallel flow of the current, and may be connected to any number of rheostats 23 to regulate the heat quantity transmitted to the glass at different points in its flow.

As shown in Fig. 4, the main lines 24 and 26 of the commercial circuit may be connected to the wires 21, and the flow of the current therethrough may be controlled by the rheostats 23 located in series with one or more of the wires 21.

In the particular form of arrangement of the wires shown in Fig. 1, the glass discharged from the rollers 8 is intercepted by a wire 27 located in the vertical plane disposed midway between opposed surface parts of the rollers and at a point intermediate the rollers and the cage 18. It operates to centrally guide the glass into the cage and prevent zig-zag lapping of the glass. If desired, a plurality of parallel spaced wires may be located intermediate the rollers and the cage.

The cage is formed of two sets of wires 21, the wires of one set, namely the wires 28, are located in vertically and horizontally spaced relation, and the wires of the other set, namely the wires 29, are bent centrally V-shaped and are located intermediate end parts of the first named wires. The wires 28 are vertically spaced and located substantially in planes that are inclined to each other, while the wires 29 are centrally bent and are disposed in spaced relation with reference to the wires 28 and also with reference to each other and form the ends of the cage 18. The wires 29 are also located in a plane that slopes toward the central part of the cage. The glass flowing from between the rollers and around the wire 27 is fed centrally into the cage where it is retarded and collected by reason of its adherability to the hot wires. By movement down over the wires and in between the wires, the portions that were delivered from the surfaces of the chilled rollers are intermixed with the interior portions and in moving over the wires, the glass is heat-regulated and is finally delivered from the lowermost of the wires. Portions of the glass move over the wires that form the sides of the cage, and their surface parts are combined as the glass is drawn or delivered from the cage.

The inclination of the planes in which the wires 28 and 29 are located is such as to prevent the flow of the glass from between intermediately disposed wires, that is the planes of the wires 28 and 29 are located at an angle less than thirty degrees to the vertical. The glass may be drawn from the lowermost wires 28. If desired, the lowermost wires 28 may be formed V-shaped in cross-section to produce a directive lower edge and a convergent flow of the glass from the glass body or mass collected by the cage. The surface glass of the mass has had opportunity to smooth out and when drawn it forms the surface glass of the ware and produces highly polished glass substantially free from imperfections.

The glass may be not only interiorly heated by the flow of the current through the resistance wires 21, but also may be exteriorly heated by suitable burners 31 connected to the pipes 32 that are in turn connected to a source of supply of fuel gas. Preferably the cage is disposed within a chamber 30 that may be formed by the end walls 11 and the side walls 33. The side walls may be pivotally supported on the hollow shafts 9 to form adjustable wings, and the pipes 32 may be supported on the lower edge parts of the walls 33. The walls may be adjusted with reference to the cage by any suitable means, such as the threaded rods 34 and the nuts 35 that engage the brackets 36 connected to the end walls 11.

The glass that is delivered or drawn from the cage may be directed to a suitable guiding frame 37 that operates to release the drawing tension and change the direction of movement of the glass from the vertical to the horizontal in the manner well known in the art. The frame is provided with suitable rollers 38 and may be located at any distance below the cage to enable desired cooling of the glass in advance of contact of the surface glass with a part of the frame.

If desired, the glass may be delivered from between the rollers 8 to a receiving wire 27 that guides the glass in its flow to a plurality of rotating spaced wires 41 disposed in any desired arrangement. The rotating wires 41 may be electrically heated by the use of suitable contact brushes that connect the source of supply of electric current with end parts of the wires as they are rotated. In the form of construction shown in Fig. 5, the stationary glass receiving wire 27 is disposed in a vertical plane located midway between the rollers, and the wires 41 are alternately disposed in planes located on opposite sides of the said vertical plane of the wire 27 to produce substantially zig-zag movement of the glass as it flows sequentially over the wires. The wires 41 are rotated by means of a chain of gear wheels 42 insulatingly connected to the opposite end parts of the wires to cause rotation of the alternate wires in opposite directions. The gear wheels 42 may be driven by a source of power operating through the gear wheel 43.

The glass may be delivered from the rotating wires 41 to a stationary wire 44 formed V-shaped in cross-section to provide a delivery edge 45 whereby the glass is caused to divergently and convergently flow as it is drawn into the sheet form. The wires 41 may be enclosed or surrounded by the walls 11 and 33 as in the form of construction shown in Fig. 1, and the glass on the wires 41 may be exteriorly heated by burners, such as the burners 31.

If desired, the glass may be delivered directly from the trough 4 to the wires arranged in any form. The glass is then usually delivered to the wires in a more highly heated and liquid state, and electric heating of the wires will be correspondingly modified or omitted. The wire from which the glass is delivered may be alone electrically heated to maintain a desired drawing temperature.

Also, if desired, the glass may be delivered from the cage shown in Fig. 1 on to a plurality of parallel vertically spaced wires, such as the wires 46 shown in Fig. 6. The wires 46 are located in substantially a vertical plane. The wires 46 may be stationary or if desired they may be rotated by the use of suitable electrically insulated gear wheels, such as by the gear wheels 42. Also the wires 46 may be connected by suitable brushes to electrically connect the rotating wires with the source of electric current to interiorly heat the glass. Also the glass may be exteriorly heated by means of burners, such as the burners 31. The glass is finally drawn from a wire or bar 47. The wire or bar 47 may be stationary and formed V-shaped in cross-section to provide a delivery edge 48 from which the glass may be drawn in sheet form. If desired, the wire or bar from which the glass is drawn may be cylindrical in form and slowly rotated to produce uniform drawing temperature.

I claim:

1. In an apparatus for forming glassware, a plurality of vertically spaced wire parts, means for rotating the wire parts, means for flowing glass on to the wire parts.

2. In an apparatus for forming glassware, a plurality of vertically spaced wire parts, means for flowing glass on to the wire parts in sequence.

3. In an apparatus for forming glassware, a plurality of spaced wire parts arranged in space surrounding form, means for flowing glass into the space surrounded by the wire parts and onto the wire parts.

4. In an apparatus for forming glassware, a plurality of spaced wire parts arranged in space surrounding form, a source of electric current, means for connecting the wire parts to the source of current, means for flowing glass on to the wire parts, and a plurality of vertically spaced wire parts means for supporting the last-named wire parts below the first named wire parts for receiving the glass from the first-named wire parts.

5. In an apparatus for forming glassware, a plurality of wire parts arranged in space surrounding form, a source of electric current, means for connecting the wire parts to the source of current, means for flowing glass on to the wire parts, a plurality of vertically spaced wire parts, means for supporting the last-named wire parts below the first-named wire parts for receiving the glass from the first-named wire parts and means for rotating the last named wire parts.

6. In an apparatus for forming glassware, a plurality of spaced wire parts, means for securing the wire parts at their ends for supporting the wire parts, a source of electric current, means for connecting the wire parts to the source of electric current, means for flowing glass against and over opposite side surfaces of each of the wire parts with respect to the direction of the stream flow and intermediate the ends of the wire parts.

7. The method of conditioning molten glass for forming glassware which includes flowing the glass over wire parts, each of the wire parts spaced from the contiguous wire parts by distances greater than the diameters of the wire parts, intermixing portions of the glass as the glass moves over the wire parts, and progressively withdrawing the glass from the wire parts to form the ware.

8. The method of conditioning molten glass for forming glassware which includes flowing the glass over the wire parts, each of the wire parts spaced from the contiguous wire parts by distances greater than the diameters of the wire parts, intermixing portions of the glass as the glass moves over the wire parts, heating the glass as it moves over the wire parts, and progressively withdrawing the glass from the wire parts to form the ware.

9. The method of conditioning molten glass for forming glassware which includes flowing the glass over wire parts spaced vertically and horizontally, each of the wire parts spaced from the contiguous wire parts by distances greater than the diameters of the wire parts, intermixing portions of the glass as the glass moves over the wire parts, and progressively withdrawing the glass from the wire parts to form the ware.

10. The method of conditioning molten glass for forming glassware which includes flowing the glass over wire parts disposed in space-enclosing form, each of the wire parts spaced from the contiguous wire parts by distances greater than the diameters of the wire parts, intermixing portions of the glass as the glass moves over the wire parts, and progressively withdrawing the glass from the wire parts to form the ware.

11. The method of conditioning molten glass for forming glassware which includes heating the glass to form a glass stream, chilling the glass of the stream, flowing the stream of glass over wire parts disposed in space-enclosing form, each of the wire parts spaced from the contiguous wire parts by distances greater than the diameters of the wire parts, intermixing portions of the glass as the glass moves over the wire parts, heating the glass as it moves over the wire parts, and progressively withdrawing the glass from the wire parts to form the ware.

12. The method of conditioning molten glass for forming glassware which includes flowing the glass over bodies of small surface areas, each of the bodies spaced vertically from the contiguous bodies by distances greater than the distance that the glass moves downward over the periphery of one of the bodies, intermixing portions of the glass as the glass moves over the bodies, and progressively withdrawing the glass from the bodies to form the ware.

13. The method of conditioning molten glass for forming glassware which includes flowing the glass over bodies of small surface areas, each of the bodies spaced vertically from the contiguous bodies by distances greater than the distance that the glass moves downward over the periphery of one of the bodies, intermixing portions of the glass as the glass moves over the bodies, heating the glass as it moves over the bodies, and progressively withdrawing the glass from the bodies to form the ware.

14. The method of conditioning molten glass for forming glassware which includes flowing the glass over bodies of small surface areas spaced vertically and horizontally, each of the bodies spaced vertically from the contiguous bodies by distances greater than the distance that the glass moves downward over the periphery of one of the bodies, intermixing portions of the glass as the glass moves over the bodies, and progressively withdrawing the glass from the bodies to form the ware.

15. The method of conditioning molten glass for forming glassware which includes flowing the glass over bodies of small surface areas disposed in space-enclosing form, each of the bodies spaced vertically from the contiguous bodies by distances greater than the distance that the glass moves downward over the periphery of one of the bodies, intermixing portions of the glass as the glass moves over the bodies, and progressively withdrawing the glass from the bodies to form the ware.

16. The method of conditioning molten glass for forming glassware which includes heating the glass to form a glass stream, chilling the glass of the stream, flowing the stream of glass over bodies of small surface areas disposed in space-enclosing form, each of the bodies spaced vertically from the contiguous bodies by distances greater than the distance that the glass moves downward over the periphery of one of the bodies, intermixing portions of the glass as the glass moves over the bodies, and progressively withdrawing the glass from the bodies to form the ware.

17. In an apparatus for conditioning molten glass; a plurality of vertically spaced, electrically-heated wire parts; and means for flowing glass on to the wire parts in sequence.

18. In an apparatus for conditioning molten glass; means for flowing glass through space in sheet form along a predetermined path and a plurality of spaced wire parts suspended in the said path in parallel relation to each other whereby the glass will flow sequentially over said wire parts.

EDWARD DANNER.